(12) United States Patent
Sako et al.

(10) Patent No.: US 7,099,258 B2
(45) Date of Patent: Aug. 29, 2006

(54) OPTICAL RECORDING MEDIUM, RECORDING APPARATUS AND METHOD FOR OPTICAL RECORDING MEDIUM, AND REPRODUCING APPARATUS AND METHOD FOR OPTICAL RECORDING MEDIUM

(75) Inventors: Yoichiro Sako, Tokyo (JP); Masanobu Yamamoto, Kanagawa (JP)

(73) Assignee: Sony Corporation, (JP)

(*) Notice: Subject to any disclaimer, the term of this patent is extended or adjusted under 35 U.S.C. 154(b) by 0 days.

(21) Appl. No.: 10/697,580

(22) Filed: Oct. 30, 2003

(65) Prior Publication Data

US 2004/0090887 A1 May 13, 2004

Related U.S. Application Data

(62) Division of application No. 09/601,733, filed as application No. PCT/JP99/06846 on Dec. 7, 1999, now Pat. No. 6,801,490.

(30) Foreign Application Priority Data

| Dec. 7, 1998 | (JP) | ................................. 10-346439 |
| Dec. 25, 1998 | (JP) | ................................. 10-370682 |
| Aug. 25, 1999 | (JP) | ................................. 11-238444 |

(51) Int. Cl.
 *G11B 7/00* (2006.01)

(52) U.S. Cl. .................................... 369/100; 369/275.4

(58) Field of Classification Search ............. 369/44.26, 369/47.15, 47.35, 47.49, 53.21, 59.21, 59.23, 369/59.25, 275.3

See application file for complete search history.

(56) References Cited

U.S. PATENT DOCUMENTS

| 5,570,339 | A | * | 10/1996 | Nagano ................... 369/275.3 |
| 5,696,757 | A | * | 12/1997 | Ozaki et al. ............. 369/47.35 |
| 5,940,364 | A | * | 8/1999 | Ogata et al. ............. 369/275.4 |
| 6,295,271 | B1 | * | 9/2001 | Inui et al. ................ 369/275.4 |
| 6,665,240 | B1 | * | 12/2003 | Kobayashi et al. ...... 369/47.15 |
| 6,810,004 | B1 | * | 10/2004 | Sako ....................... 369/275.4 |

* cited by examiner

*Primary Examiner*—Tan Dinh
(74) *Attorney, Agent, or Firm*—Lerner, David, Littenberg, Krumholz & Mentlik, LLP

(57) ABSTRACT

Audio data of 20 bits is separated into first data of upper 16 bits and second data of lower 4 bits. EFM modulation data is formed from the first data. A laser beam is on/off controlled in correspondence to the logic level of channel data obtained by NRZI modulating a serial data train. The first data, therefore, is recorded in a manner similar to the case of a compact disc. Each pit is controlled so as to have a displacement in the right/left direction for the track center in accordance with the second data and the deviated pit is formed. When data is recorded by the displacement of the pit, since a high frequency component of a tracking error signal changes upon reproduction, the second data can be extracted from the tracking error signal.

5 Claims, 8 Drawing Sheets

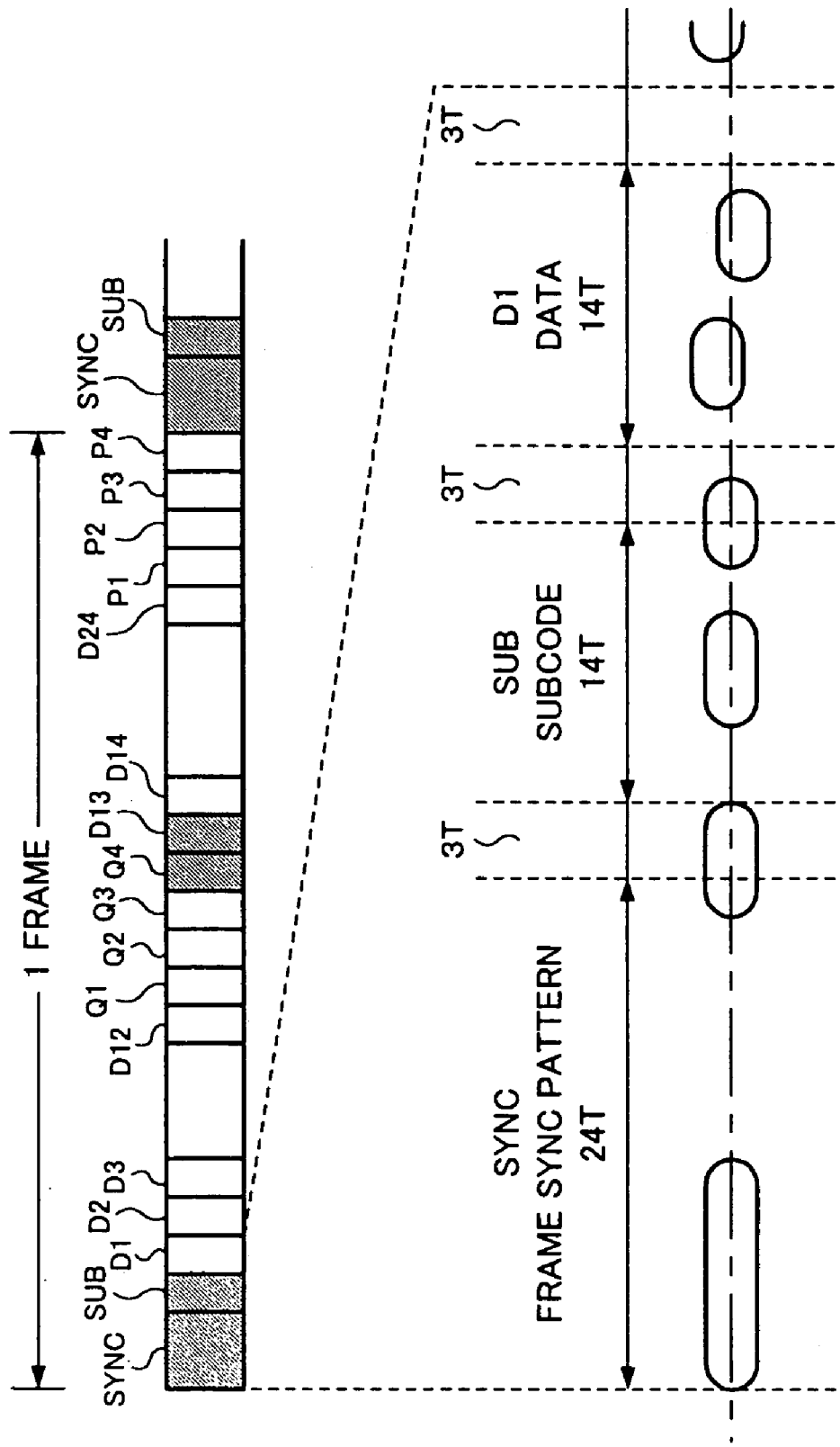

"0"  "1"

| DATA WORD (4 BITS) | CODE WORD (5 BITS) |
|---|---|
| 0000 | 00101 |
| 0001 | 00110 |
| 0010 | 01001 |
| 0011 | 01010 |
| 0100 | 01011 |
| 0101 | 01100 |
| 0110 | 01101 |
| 0111 | 01110 |
| 1000 | 10001 |
| 1001 | 10010 |
| 1010 | 10011 |
| 1011 | 10100 |
| 1100 | 10101 |
| 1101 | 10110 |
| 1110 | 11001 |
| 1111 | 11010 |

OPTICAL RECORDING MEDIUM, RECORDING APPARATUS AND METHOD FOR OPTICAL RECORDING MEDIUM, AND REPRODUCING APPARATUS AND METHOD FOR OPTICAL RECORDING MEDIUM

CROSS-REFERENCE TO RELATED APPLICATIONS

This application is a divisional application of Application Ser. No. 09/601,733 filed Aug. 7, 2000, now U.S. Pat. No. 6,801,490, the disclosure of which is hereby incorporated by reference herein. Application Ser. No. 09/601,733 is a national phase entry under 35 U.S.C. § 371 of International Application No. PCT/JP99/06846 filed Dec. 7, 1999, published in Japanese, which claims priority from Japanese Application Nos. 346439/1998 filed Dec. 7, 1998, 370682/1998 filed Dec. 25, 1998, and 238444/1999 filed Aug. 25, 1999.

BACKGROUND OF THE INVENTION

1. Technical Field

The present invention relates to an optical recording medium suitable when it is applied to an optical disc such as a compact disc, recording apparatus and method for the optical recording medium, and reproducing apparatus and method for the optical recording medium.

2. Background Art

A compact disc (hereinafter, abbreviated to CD) has been spread as an optical disc. In the CD, audio data is sequentially divided into blocks, subjected to an encoding of an error correction code, and after that, and EFM (Eight To Fourteen) modulated, and a modulation result is recorded by an NRZI (Non Return to Zero Inverted) modulation.

As a result of the EFM modulation, for a basic period T serving as a period of a channel clock, the audio data is recorded onto the disc by a repetition of pits and a land having nine kinds of lengths 3 T to 11 T in which the basic period T is used as a unit. In case of a CD, each pit has a length of about 0.87 to 3.18 [µm] in correspondence to 3 T to 11 T, a pit width of about 0.5 [µm], and a depth of about 0.1 [µm].

The audio data recorded on the CD is 2-channel data in which a sampling frequency is equal to 44.1 [kHz] and the number of quantization bits is equal to 16 bits. However, it is also demanded to realize a high sound quality and multichannels. In this case, it is necessary that there is reproducing compatibility in which the audio data can be reproduced by the existing CD player. It is not preferable that a time of an audio program which can be recorded on one CD becomes short due to the realization of the high sound quality and multichannels. Further, since a copy preventing technique for copyright protection is not used in the CD, in a present situation, data is illegally copied.

DISCLOSURE OF INVENTION

The invention is made in consideration of such a situation and it is an object of the invention to provide an optical recording medium in which a time of a program which can be recorded does not become short, there is a reproducing compatibility, a high sound quality can be realized, the copyright can be protected, and further, a use range of the optical medium such as a CD or the like can be extended. According to the invention, there are also provided recording apparatus and method for such an optical recording medium and reproducing apparatus and method for such an optical medium.

According to the invention of claim 1, there is provided an optical recording medium having tracks each of which is constructed by a plurality of pits which are formed on the basis of first data to be recorded and a land between the pits, wherein the plurality of pits are deviated from the center of the track on the basis of second data.

According to the invention of claim 10, there is provided a recording apparatus for an optical recording medium, comprising:

a light source for outputting a recording laser beam;

a light modulator for modulating the recording laser beam outputted from the light source on the basis of supplied first data;

a light deflector for deflecting the modulated recording laser beam that is outputted from the light modulator on the basis of supplied second data in the direction which almost perpendicularly crosses a scanning direction of the modulated recording laser beam of an optical recording medium; and an objective lens for converging the modulated recording laser beam that is outputted from the light deflector onto the optical recording medium.

According to the invention of claim 15, there is provided a reproducing apparatus for an optical recording medium having tracks each of which is constructed by a plurality of pits which are formed on the basis of first data to be recorded and a land between the pits, comprising:

an optical pickup for reading out the first data and second data from an optical recording medium on which the plurality of pits have been deviated from the center of the track on the basis of the second data;

a first demodulating unit for demodulating the first data on the optical recording medium on the basis of an output signal from the optical pickup; and a second demodulating unit for demodulating the second data on the optical recording medium on the basis of the output signal from the optical pickup.

According to the invention of claim 22, there is provided a reproducing apparatus for an optical recording medium having tracks each of which is constructed by a plurality of pits which are formed on the basis of first data to be recorded and a land between the pits, comprising:

an optical pickup for reading out the first data and second data from an optical recording medium on which the plurality of pits have been deviated from the center of the track on the basis of the second data;

a first demodulating unit for demodulating the first data on the optical recording medium on the basis of an output signal from the optical pickup;

a second demodulating unit for demodulating the second data on the optical recording medium on the basis of the output signal from the optical pickup; and a control unit for controlling the operation of the second demodulating unit on the basis of identification data read out from the optical recording medium by the optical pickup.

According to the invention of claim 32, there is provided an optical recording medium comprising:

a data recording region having a spiral track is constructed by a plurality of pits which are formed on the basis of first data to be subjected to a predetermined modulation and recorded and a land between the pits; and a management data region in which management data of the first data which is recorded in the data recording region is recorded, wherein the plurality of pits are deviated from the center of the track on the basis of second data.

According to the invention of claim 44, there is provided a recording method for an optical recording medium, comprising the steps of:

modulating a recording laser beam outputted from a light source on the basis of supplied first data;

deflecting the modulated recording laser beam on the basis of supplied second data in the direction which almost perpendicularly crosses a scanning direction of the modulated recording laser beam of an optical recording medium; and converging the modulated and deflected recording laser beam onto the optical recording medium by an objective lens.

According to the invention of claim 47, there is provided a reproducing method for an optical recording medium having tracks each of which is constructed by a plurality of pits which are formed on the basis of first data to be recorded and a land, between the pits, comprising the steps of:

reading out first data and second data from an optical recording medium on which the plurality of pits have been deviated from the center of the track on the basis of the second data;

demodulating the first data on the basis of the data read out from the optical recording medium; and demodulating the second data on the basis of the data read out from the optical recording medium.

According to the invention of claim 53, there is provided a reproducing method for an optical recording medium which has tracks each of which is constructed by a plurality of pits which are formed on the basis of first data to be recorded and a land between the pits and in which the plurality of pits are deviated from the center of the track on the basis of second data and on which identification data has been recorded, comprising the steps of:

demodulating the first data on the basis of the data read out from the optical recording medium; and demodulating the second data on the basis of the data read out from the optical recording medium in accordance with an identification result of the identification data read out from the optical recording medium.

BRIEF DESCRIPTION OF DRAWINGS

FIG. 6 is a schematic diagram for use in explanation of an example of a displacement of a pit in the embodiment of the invention;

BEST MODE FOR CARRYING OUT THE INVENTION

Figure 1:
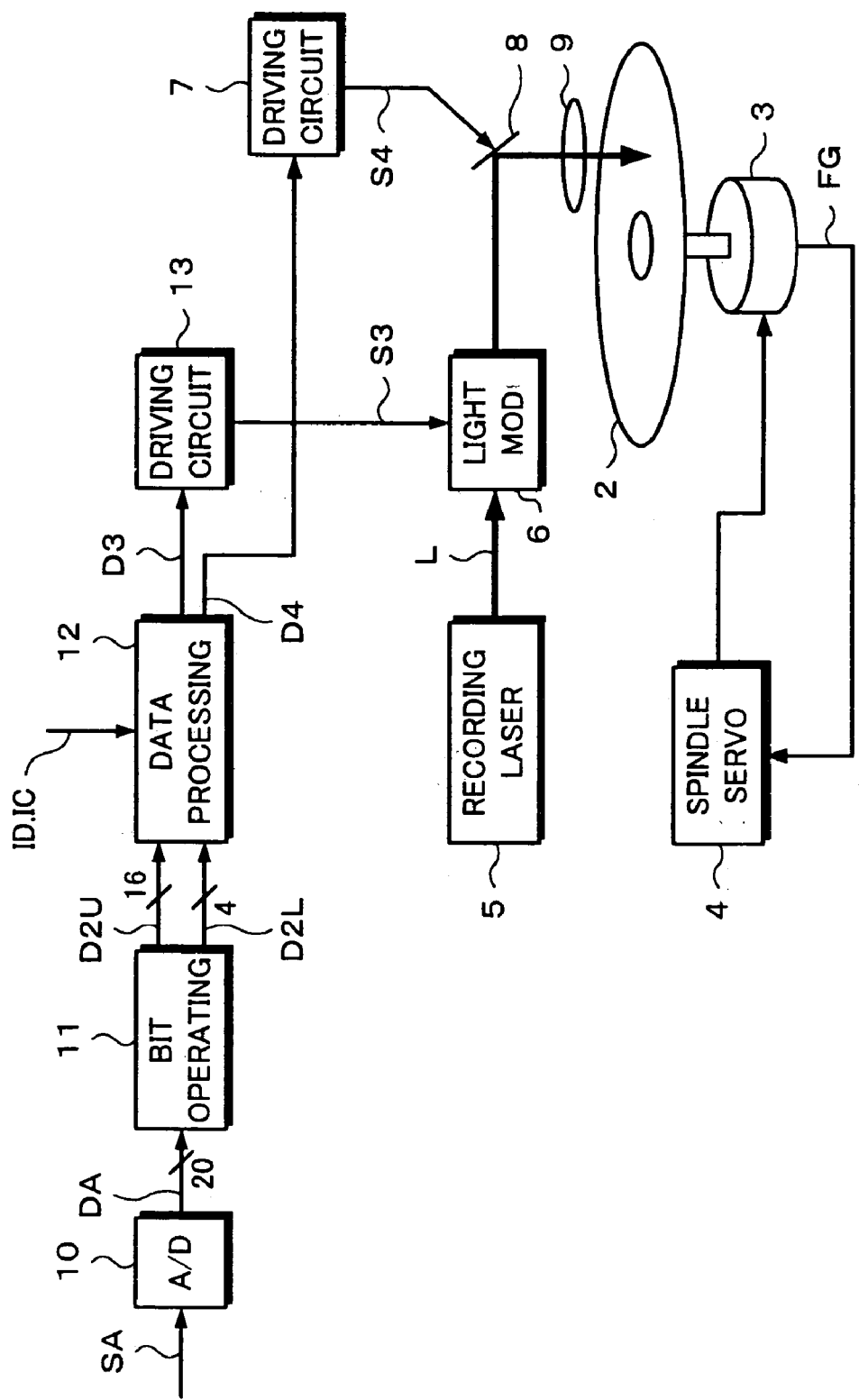
FIG. 1 is a block diagram of an embodiment of a recording apparatus according to the invention.

An embodiment of the invention will now be described hereinbelow with reference to the drawings. The embodiment relates to an example in which the invention is applied to an optical disc such as a CD. In FIG. 1, reference numeral 1 denotes an optical disc recording apparatus which is used in a manufacturing of an optical disc. In the embodiment, after a mother disc 2 exposed by the optical disc recording apparatus 1 was developed, it is subjected to an electroforming process, so that a mother disc, namely, a stamper is formed. Further, optical discs are manufactured by using the stamper.

The mother disc 2 which is exposed is formed by, for example, coating a sensitive material (photoresist) onto a flat glass substrate. A spindle motor 3 rotates the mother disc 2 by a control of a spindle servo circuit 4. An FG signal generator provided in a bottom portion generates an FG signal FG whose signal level rises every predetermined rotational angle to the spindle motor 3. The spindle servo circuit 4 drives the spindle motor 3 so that the FG signal is set to a predetermined frequency, thereby driving the mother disc 2 at a constant linear velocity (CLV).

The mother disc 2 which is exposed as mentioned above is formed by coating, for example, a sensitive material (resist) onto a flat glass substrate. The spindle motor 3 rotates the mother disc 2 by the control of the spindle servo circuit 4. In this instance, the FG signal generator provided in the bottom portion generates the FG signal FG whose signal level rises every predetermined rotational angle to the spindle motor 3. The spindle servo circuit 4 drives the spindle motor 3 so that the FG signal FG is set to the predetermined frequency, thereby rotating the mother disc 2 by a condition of the constant linear velocity.

A laser 5 for recording is made of a gas laser or the like and irradiates a laser beam of a predetermined light amount. A light modulator 6 is constructed by an electroacoustic optical device or the like and a laser beam L emitted from the recording laser 5 is on/off controlled in response to a driving signal S3. The laser beam from the light modulator 6 enters a mirror 8.

The mirror 8 bends an optical path of the laser beam L by, for example, 90° so that the laser beam is transmitted toward the mother disc 2. An objective lens 9 converges the reflection light from the mirror 8 onto the recording surface of the mother disc 2, namely, onto a sensitive material coated on the recording surface. A displacement of the mirror 8, that is, a displacement in the direction which crosses the direction of the tracks, namely, in the radial direction of the mother disc 2 is controlled by a driving signal S4 from a driving circuit 7. That is, a pit which is formed on the mother disc 2 is deviated in the recording direction of data, namely, to either the right or the left for the radial direction of the mother disc 2. A displacement amount of the pit is set to a range where a laser beam for reproduction does not enter an off-track state upon reproduction, in other words, a range within a predetermined amount where the deviated pit can be read.

The mirror 8 and objective lens 9 are sequentially moved by a threading mechanism (not shown) in the radial direction of the mother disc 2 synchronously with the rotation of the mother disc 2. Thus, the optical disc recording apparatus 1 sequentially deviates the converging position of the laser beam L in the outer peripheral direction of the mother disc 2, thereby spirally forming the track onto the mother disc 2. A pit train according to the modulation signal S3, namely, a pit train whose displacement from the track center has been modulated by the modulation signal S4 from the driving circuit 7 is formed on the track.

Besides the mirror 8, a light deflector can be used to deviate the pit to the right or left for the recording direction. For example, the recording laser beam can be deflected by an AOD (Acousto Optic Deflector) or an EOD (Electro Optic Deflector).

An audio signal SA which is outputted from a predetermined music source, namely, an analog audio signal here is supplied to an analog/digital (A/D) converting circuit 10. The A/D converting circuit 10 analog/digital converts the audio signal SA and generates audio data DA of a sampling frequency 44.1 [kHz] and parallel 20 bits.

A bit operating unit 11 separates the 20-bit parallel audio data DA into audio data D2U of 16 bits on the upper side and audio data D2L of 4 bits on the lower side and outputs them. Thus, the bit operating unit 11 separates the audio data D2U whose sound quality is equivalent to that of the conventional compact disc from the audio data DA and produces the data D2L for quality improvement which can improve the sound quality of the audio data D2U by adding the data D2L to the separated audio data D2U.

A data processing circuit 12 inputs data of TOC (Table of Contents) to be recorded in a lead-in area in a manner similar to the existing compact disc and processes the TOC data in accordance with the format specified with respect to the compact disc. Thus, the data processing circuit 12 forms channel data corresponding to the pit train and outputs it.

Disk identification data ID showing that the data D2L for quality improvement has been recorded and copy identification data IC indicative of the original compact disc which is formed from the stamper are allocated to the TOC data that is recorded as mentioned above. Thus, according to the embodiment, upon reproduction, the audio data DA which was separated into upper 16 bits and lower 4 bits and processed can be reproduced on the basis of a detection result of the disc identification data ID. Whether the disc is the original optical disc or the copied optical disc can be discriminated on the basis of the copy identification data IC.

The data processing circuit 12 similarly processes the audio data D2U of upper 16 bits which is outputted from the bit operating unit 11 in accordance with the same format as that specified with regard to the existing compact disc, forms channel data D3 corresponding to the pit train, and outputs it.

That is, the data processing circuit 12 adds an error correction code or the like to the audio data D2U and, thereafter, performs an interleaving process, and EFM modulates a processing result. In the EFM modulation, the data processing circuit 12 forms 14 channel bits by the period that is 14 times as long as a basic period T from each byte of the audio data D2U and connects the data of the 14 channel bits by connection bits of 3 channel bits.

FIG. 2A shows a part of EFM modulation data. The data processing circuit 12 NRZI modulates the serial data train, thereby forming the channel data D3 (FIG. 2B). In case of the ordinary compact disc, as shown in FIG. 2C, the laser beam L is on/off controlled in accordance with the channel data D3 and a pit train having a pit width 0.5 [μm] is formed. As mentioned above, in the embodiment, the laser beam is deflected by the mirror 8 and each pit is deviated to the right or left for the track-center.

By the process corresponding to the processing unit of the audio data D2U of upper 16 bits, the data processing circuit 12 adds an error correction code to the audio data D2L of lower 4 bits and performs the interleaving process and, thereafter, converts it into a serial data train. In this instance, the data processing circuit 12 adds the error correction code by allocating two series of unit parities of an 8-bit unit. That is, in correspondence to the process of the audio data D2U on the upper side, the data processing circuit 12 forms blocks by six data (48 bits) by grouping the audio data D2L on an 8-bit unit basis and adds one parity by 4 bits to each block. Further, the data processing circuit 12 interleaves one block comprising those six data (48 bits) and one parity (8 bits) and, thereafter, adds the parity of 8 bits.

The data processing circuit 12 converts the bit train formed as mentioned above into a serial data train. The data processing circuit 12 further forms displacement control data D4 obtained by sequentially allocating each bit of the serial data to a logic level in which the logic level of the channel data D3 corresponds to the pit and outputs the data D4. More specifically speaking, logic "0" or "1" of each bit of the data obtained by processing the data of lower 4 bits is allocated to the right or left displacement of each pit as shown in FIG. 2D.

A driving circuit 13 receives the channel data D3 which is outputted by the data processing circuit 12 as mentioned above and forms the driving signal S3 for turning on/off the laser beam in correspondence to the logic level of the channel data D3. Therefore, the upper 16 bits in the data of 20 bits constructing the audio data DA are recorded on the mother disc 2 so that they can be correctly reproduced by an ordinary optical disc player, namely, what is called a compact disc player.

The driving circuit 7 forms the driving signal S4 so that each pit formed on the disc has a displacement in the right/left direction for the track center in accordance with the displacement control data D4. Therefore, as shown in FIG. 2D, a pit in which the pit corresponding to the data of upper 16 bits has been deviated in accordance with the displacement control data D4 is formed on the disc in a manner similar to the ordinary compact disc. The displacement control data D4 corresponds to the data of lower 4 bits. As mentioned above, in the embodiment, the data D2L for quality improvement is recorded as logic "0" or "1" by the displacement of the pit from the track center.

When the displacement control data D4 is recorded by the displacement of the pit from the track center, a tracking error signal RFD changes in accordance with the displacement control data D4 as will be explained hereinlater. Therefore, the displacement control data D4 can be extracted from the tracking error signal RFD. In the embodiment, as shown in FIG. 2D, the displacement width is selected to ±50 [nm] so that the audio data of upper 16 bits can be reproduced by the conventional compact disc player.

In the embodiment, 20 bits constructing one sample are divided into upper 16 bits and lower 4 bits, the upper 16 bits are recorded as pits and a land, and the lower 4 bits are recorded as a displacement of the pit. Since the recording system differs as mentioned above, it is necessary to keep a synchronizing relation between both data. For example, according to the signal format of the compact disc, since the number of words (the number of symbols) of the data included in one frame is fixed, the 4-bit data corresponding to the 16-bit data included in one frame is recorded in the same frame. This method is shown as one method and another method can be used as a method of realizing the synchronizing relation. Further, the synchronizing relation is not always necessary in dependence on the kind of data to be recorded as a displacement of the pit as will be explained hereinlater.

The optical disc which is manufactured by the optical disc recording apparatus 1 in FIG. 1 is hereinbelow called an ExCD disc in case of showing it in distinction from the existing compact disc. In case of the ExCD disc, it is similar to the existing compact disc as for a point that it has a lead-in area on the innermost rim side and a lead-out area on the outermost rim side.

Figure 3:
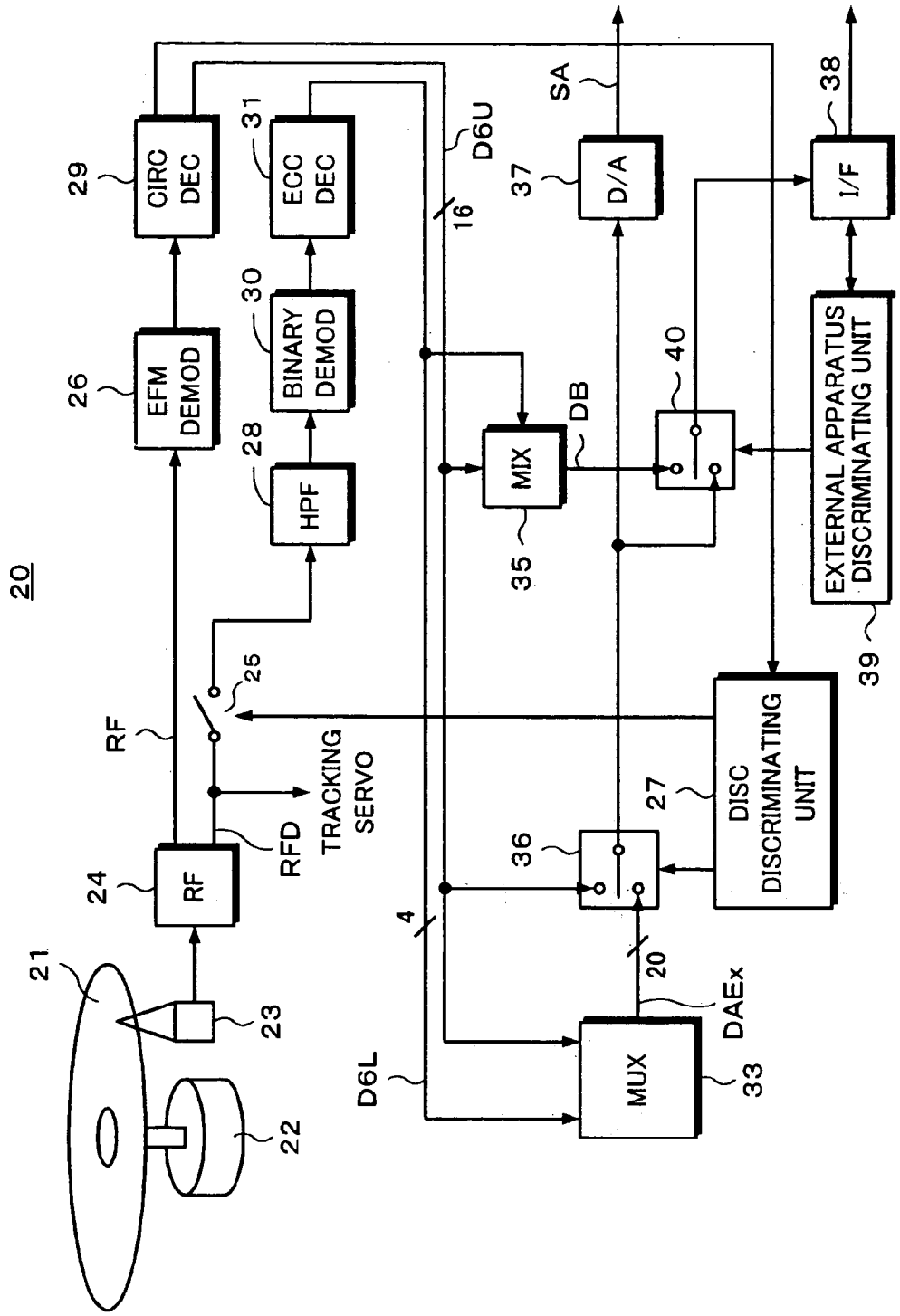
FIG. 3 is a block diagram of an embodiment of a reproducing apparatus according to the invention.

FIG. 3 is a block diagram showing an optical disc player. In FIG. 3, reference numeral 20 denotes an optical disc player as a whole. The optical disc player 20 can reproduce the existing optical disc and ExCD disc. An optical disc 21 such as a compact disc, ExCD disc, or the like is rotated at a linear velocity by a spindle motor 22.

The optical disc 21 is read by an optical pickup 23. An output signal of the optical pickup 23 is supplied to an RF circuit 24. The optical pickup 23 irradiates a laser beam onto the optical disc 21 by a built-in semiconductor laser and receives its return light by a predetermined photosensitive device. The RF circuit 24 performs an amplification and an arithmetic operation of an output signal from the photosensitive device of the optical pickup 23 and generates a reproduction signal RF, the tracking error signal RFD, and a focusing error signal (not shown). On the basis of the tracking error signal RFD and focusing error signal, a servo circuit (not shown) forms servo signals for performing a tracking servo and a focusing servo of an objective lens of the optical pickup 23 and supplies those signals to the optical pickup 23.

Figure 4:
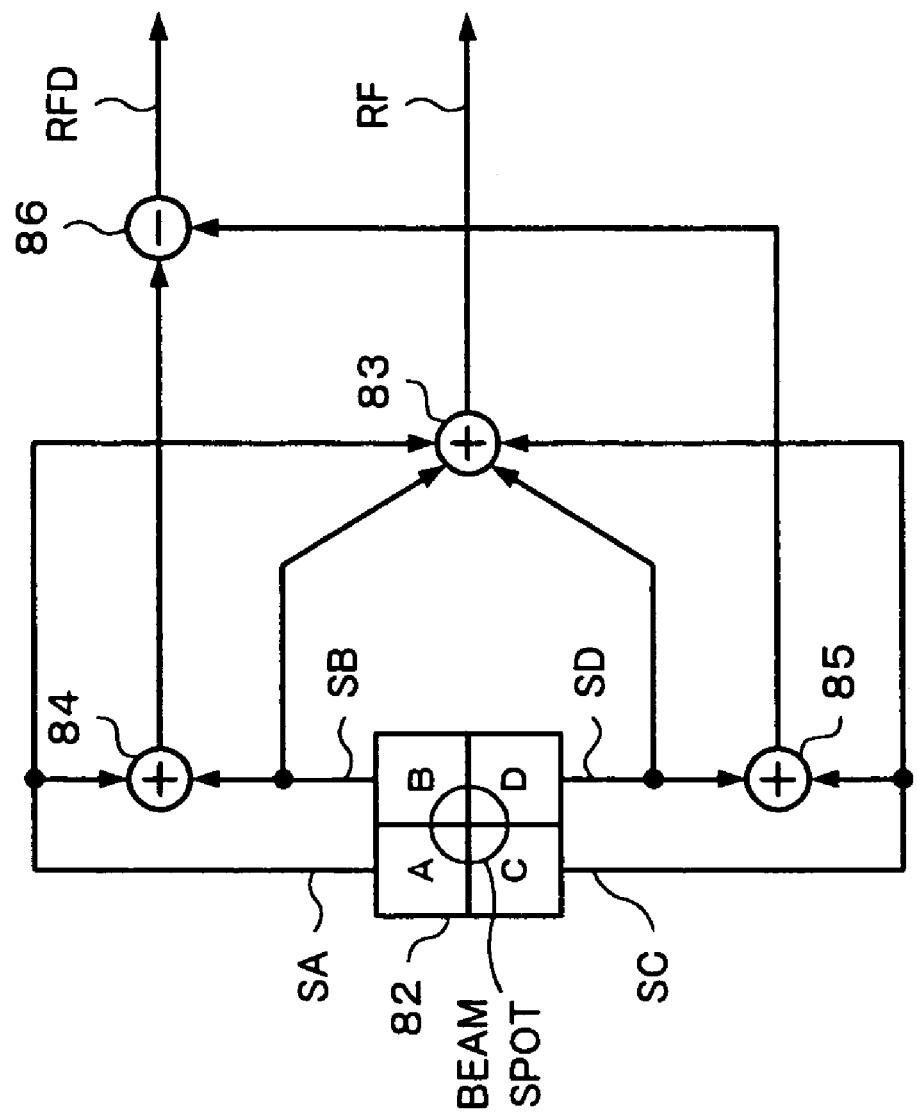
FIG. 4 is a schematic diagram for use in explanation of an example of a pickup provided for the reproducing apparatus.

For example, the optical pickup 23 and RF circuit 24 are constructed as shown in FIG. 4. In FIG. 4, a 4-split detector 82 has four photosensitive devices A to D divided in the track direction of the disc and the direction which perpendicularly crosses the track direction. Detection signals SA to SD of the photosensitive devices A to D are calculated by an arithmetic operating circuit in the RF circuit 24. The reproduction signal RF is formed by adding the detection signals of the photosensitive devices by an adding circuit 83, namely, by an arithmetic operation (SA+SB+SC+SD). An arithmetic operation {(SA+SB)−(SC+SD)} is calculated by adding circuits 84 and 85 and a subtracting circuit 86. Thus, the tracking error signal RFD is formed. A signal level of the reproduction signal RF changes in accordance with the pits and lands formed on the optical disc 21. Further, a high frequency component of the tracking error signal RFD changes in accordance with the displacement direction of the pit formed on the optical disc 21.

As a construction to detect a tracking error, various constructions other than that shown in FIG. 4 can be used. For example, it is possible to use what is called a 3-beam method using three beam spots, what is called a push-pull method using a 2-split detector, what is called a heterodyne method of sampling a difference between photosensing outputs in the diagonal direction of a 4-split detector by an edge of the RF signal, or the like.

The tracking error signal RFD is supplied to a tracking servo circuit (not shown), thereby allowing the spot of the reading laser beam on the optical disc 21 to pass through the track center. Assuming that the optical disc 21 is the ExCD disc, the pit is deviated for the track center and the level of the tracking error signal RFD changes in correspondence to the displacement. The level change of the tracking error signal relates to a high frequency component and corresponds to a frequency component to which a tracking servo circuit portion in the foregoing servo circuit hardly responds. The tracking servo circuit portion has a function for correcting an off-track due to eccentricity occurring when the disc is manufactured or when the disc is loaded and is usually constructed so as to correct the tracking error of a relatively low frequency component. Even in case of using the ExCD disc as an optical disc 21, therefore, the reproduction signal is not influenced in dependence on the displacement of the pit and the spot of the reading laser beam passes through the track center. In this case, since the displacement amount of the pit for the track center is suppressed to ±0.05 [μm], the deviated pit can be read.

Explanation will be made while returning to FIG. 3. The reproduction signal RF from the RF circuit 24 is supplied to an EFM (Eight to Fourteen Modulation) demodulating circuit 26. The tracking error signal RFD is supplied to a binary demodulating circuit 30 via a selecting circuit 25 and a high pass filter 28. The high pass filter 28 is provided to extract the high frequency component showing the pit displacement in the tracking error signal RFD. When the fact that the optical disc 21 is the ExCD disc is detected by a disc discriminating unit 27 on the basis of TOC data, which will be explained hereinlater, the selecting circuit 25 transmits the tracking error signal RFD from the RF circuit 24 to the high pass filter 28 by the control of the disc discriminating unit 27.

As mentioned above, in case of the ExCD disc, the disc identification data ID and the copy identification data IC showing that the disc is the original optical disc which is formed from the mother disc are recorded as TOC data. Just after the optical disc 21 was loaded, a CIRC (Cross Interleaved Reed Solomon Code) decoder 29 processes the reproduction signal RF, thereby reproducing the TOC data recorded in the lead-in area on the optical disc 21 and outputs it to a system controller (disc discriminating unit 27). When the disc discriminating unit 27, therefore, discriminates that the optical disc 21 is the ExCD disc on the basis of a detection result of the disc identification data ID, the selecting circuit 25 is turned on.

The EFM demodulating circuit 26 EFM demodulates the reproduction signal RF which is outputted from the RF circuit 24. The CIRC decoder 29 descrambles output data of the EFM demodulating circuit 26 and performs an error correcting process by the error correction code added upon recording, thereby reproducing and outputting the audio data D6U. As mentioned above, even if the optical disc 21 is the existing compact disc or ExCD disc, audio data D6U of 16 bits/sample is outputted from the reproduction signal RF corresponding to the presence or absence of the pit in a manner similar to the case of the signal process in the existing compact disc player.

When the selecting circuit 25 is turned on in response to an output from the disc discriminating unit 27, the high frequency component of the tracking error signal RFD is supplied to the binary demodulating circuit 30. The binary demodulating circuit 30 discriminates the level change of the high frequency component of the tracking error signal RFD by comparing the input signal with a threshold value, thereby generating binary reproduction data regarding the quality improvement data.

An ECC decoder 31 error-correction processes the reproduction data which is outputted from the binary demodulating circuit 30 and deinterleaves it, thereby reproducing and outputting quality improvement data D6L of 4 bits. When the optical disc 21 is the existing disc, the ECC decoder 31 outputs 4-bit data of (0000) in place of the 4-bit quality improvement data D6L in the case where the audio data D6U is processed by the exclusive OR in a mixer 35, which will be explained hereinlater. In case of processing the audio data D6U by a multiplication in the mixer 35, a data train of 4 bits according to predetermined random number data is sequentially outputted.

A multiplexer (MUX) 33 adds the 4-bit parallel quality improvement data D6L which is outputted from the ECC decoder 31 to the lower side of the 16-bit parallel audio data which is outputted from the CIRC decoder 29 and generates 20-bit parallel audio data DAEx. Consequently, when the optical disc 21 is the ExCD disc, the multiplexer 33 generates the audio data DAEx of a high sound quality, namely, 20 bits/sample.

On the other hand, the mixer (MIX) 35 adds each bit of the quality improvement data D6L that is outputted from the ECC decoder 31 to lower 4 bits of the 16-bit parallel audio data D6U which is outputted from the CIRC decoder 29 on the basis of the exclusive OR. Thus, the mixer 35 outputs audio data DB which is formed by deteriorating the sound quality of the audio data which is outputted from the CIRC decoder 29. In case of outputting the data according to the random numbers from the ECC decoder 31 mentioned above, the mixer 35 multiplies the lower 4 bits of the audio data by the random number data, thereby generating the audio data DB formed by deteriorating the sound quality.

The disc discriminating unit 27 is controlled by a system controller (not shown). When the optical disc 21 is loaded, the system controller allows the optical pickup 23 to be sought, obtains information such as the number of music pieces recorded on the optical disc 21, playing time, and the like from the TOC data in the lead-in area on the optical disc 21, and displays it by predetermined display means. In this instance, the system controller also obtains the disc identification data ID of the optical disc 21, thereby discriminating whether the loaded optical disc 21 is the existing compact disc or ExCD disc by checking the disc identification data ID. The disc discriminating unit 27 switches selecting circuits 25 and 36 on the basis of a discrimination result.

That is, when the optical disc 21 is the ExCD disc, the selecting circuit 25 is turned on and the selecting circuit 36 selects an output of the multiplexer 33. The audio data DAEx of a high sound quality is, therefore, outputted from the selecting circuit 36. When the optical disc 21 is the existing compact disc, the selecting circuit 36 selectively outputs the audio data D6U which is outputted from the CIRC decoder 29 to a digital/analog (D/A) converting circuit 37.

The D/A converting circuit 37 digital/analog converts the audio data which is outputted from the selecting circuit 36 and generates the analog audio signal SA. In the optical disc player 20, therefore, as for a reproduction sound quality by the analog signal, in case of the existing compact disc, the audio data D6U which is outputted from the CIRC decoder 29 is processed and the data of a sound quality (shown by a CD sound quality) corresponding to 16 bits similar to that of the existing compact disc can be reproduced. In case of the ExCD disc, the audio data DAEx which is outputted from the multiplexer 33 is selectively processed and the data of a high sound quality (ExCD sound quality) corresponding to 20 bits can be reproduced.

In FIG. 3, an interface 38 constructs an input/output circuit for transmitting or receiving various data to/from an external apparatus or the like. For example, the interface 38 outputs audio data to an audio recorder and transmits or receives various data regarding the audio data. An external apparatus discriminating unit 39 is connected through the interface 38. The external apparatus discriminating unit 39 authenticates the external apparatus, thereby deciding whether the connected external apparatus is a legal apparatus (apparatus in which the copying operation or movement of data is permitted) or not.

A selecting circuit 40 is controlled in accordance with a discrimination result of the external apparatus discriminating unit 39. When it is determined that the legal apparatus is connected as a result of the authentication, the digital audio data from the selecting circuit 36 is outputted to the external apparatus via the interface 38. When it is determined that the external apparatus is not the legal apparatus, the selecting circuit 40 outputs the digital audio data of a low sound quality from the mixer 35 to the external apparatus. In this manner, the copyright is protected.

It is also possible to construct the apparatus in such a manner that when the disc discriminating unit 27 determines that the data is not original, namely, the data is the data copied from the ExCD disc by checking the copy identification data IC recorded as TOC data of the Ex disc, the selecting circuits 25 and 36 are controlled and the data of 16 bits/sample similar to that of the existing compact disc is outputted.

It is also possible to reproduce the recorded data as a displacement of a pit and output it independently of the reproduction data from the optical disc.

Figure 2:
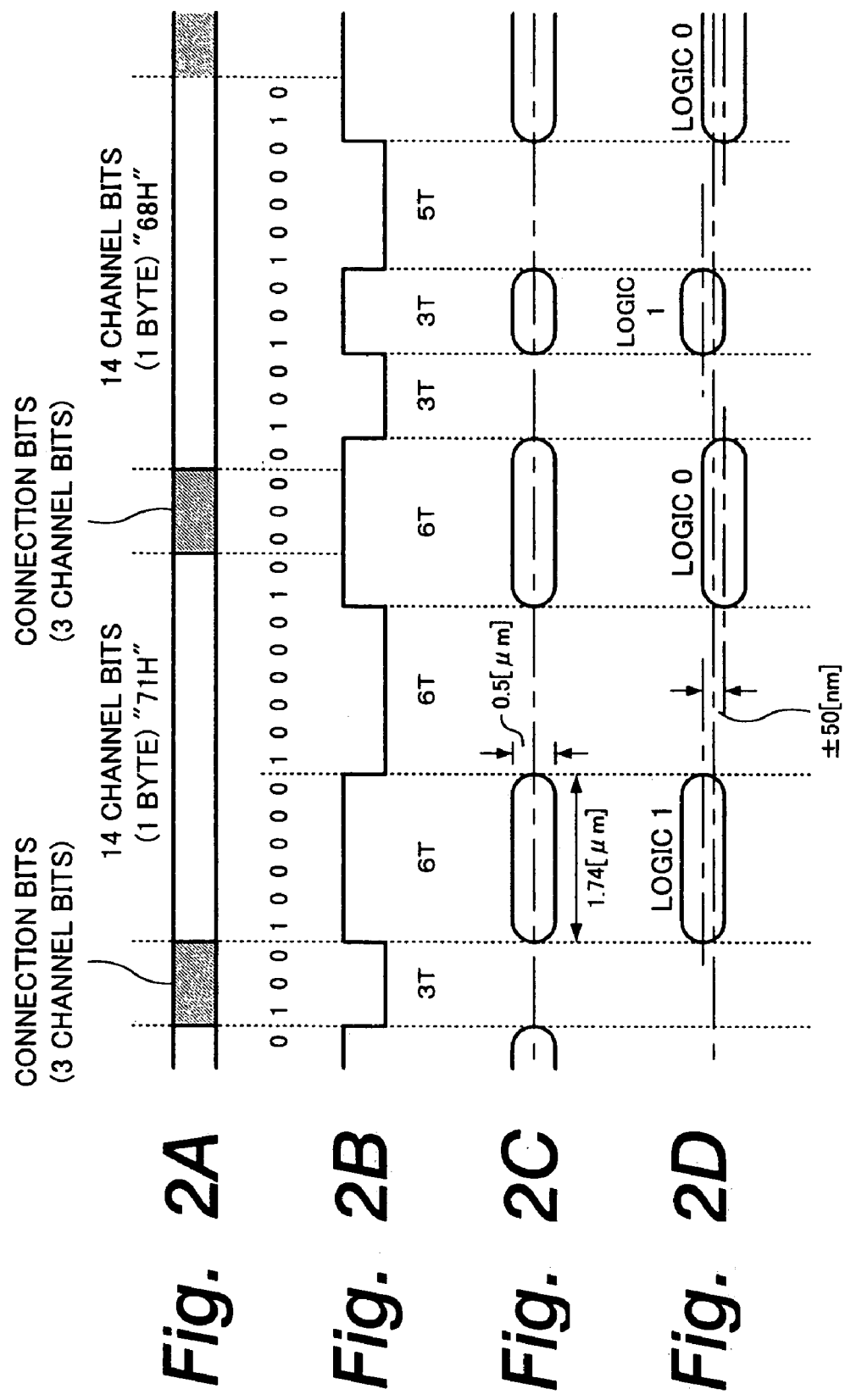
FIGS. 2A to 2D are schematic diagrams for use in explanation of a recording process of data in the embodiment of the invention.

In the foregoing embodiment, as described with reference to FIG. 2, the pit is deviated to the left and right for the recording direction (track direction) in correspondence to logic "0" and logic "1" of each bit of the displacement control data D4, respectively. That is, assuming that the 16-bit audio data which is recorded by the repetition of the pits and land is referred to as first data and the displacement control data D4 (data of lower 4 bits) is referred to as second data, each bit of the second data is recorded by the displacement of each pit.

Figure 5:
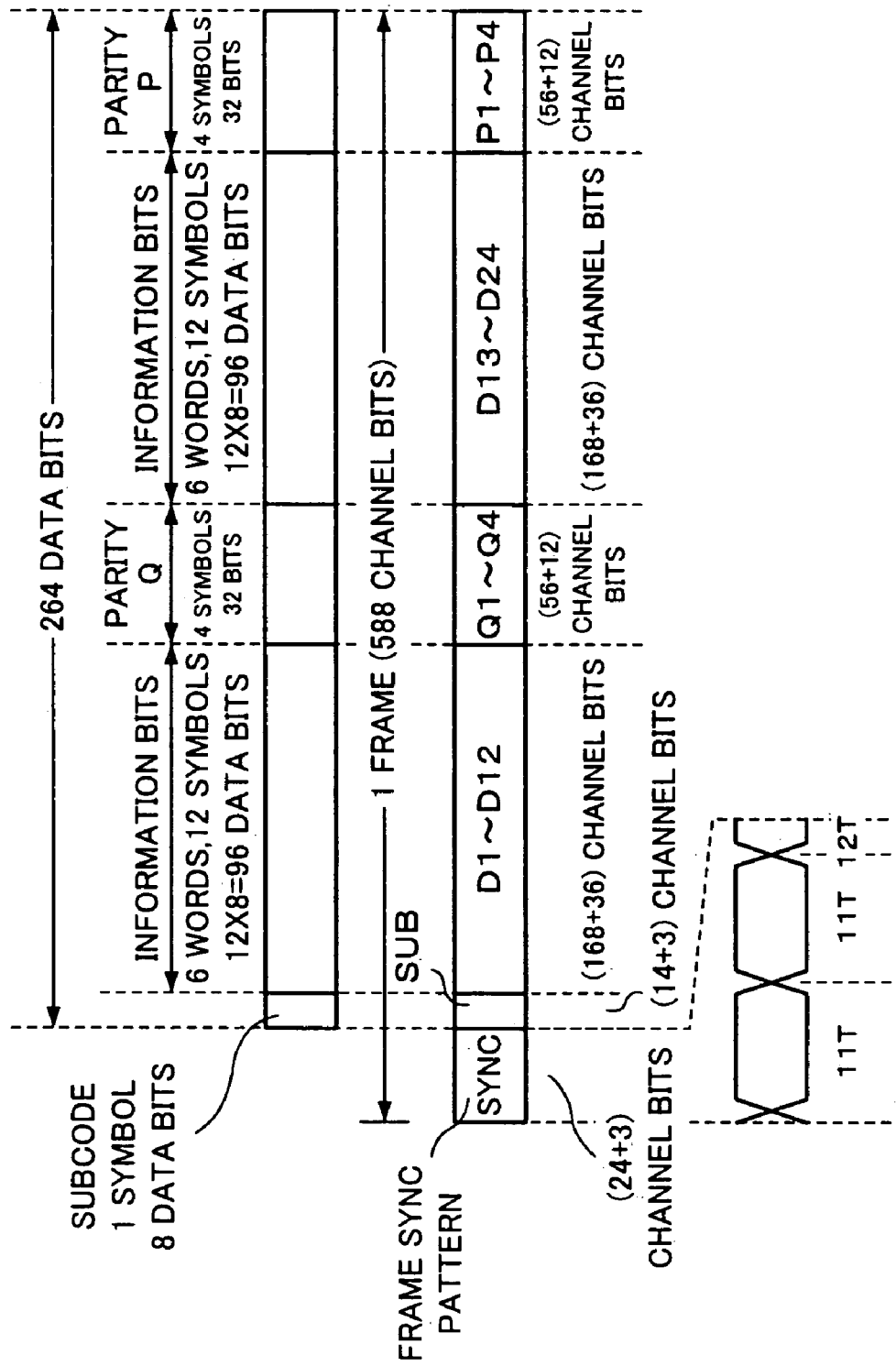
FIG. 5 is a schematic diagram for use in explanation of a data construction of a compact disc to which the invention can be applied.

A point that data is recorded by the displacement of the pit will be more specifically explained hereinbelow and an example different from that mentioned above will be further described. FIG. 5 shows a data format of the existing compact disc. In the compact disc, parities Q and P each consisting of 4 symbols are formed from total 12 samples (24 symbols) of the digital audio data of two channels. 33 symbols (264 data bits) obtained by adding one symbol of a subcode to those total 32 symbols are handled as one bundle. That is, 33 symbols comprising the subcode, data D1 to D24, parities Q1 to Q4, and parities P1 to P4 are allowed to be included in one frame after the EFM modulation.

In the EFM modulation, each symbol (8 data bits) is converted into 14 channel bits. Connection bits of 3 bits are arranged between the 14 channel bits and the 14 channel bits. A frame sync pattern is further added to the head of the frame. Assuming that the period of the channel bits is labelled to T, the frame sync pattern is set to a pattern in which 11 T, 11 T, and 2 T continue is formed. Such a pattern does not occur according to the EFM modulation rule and enables the frame sync to be detected by a special pattern.

In the EFM modulation, a length in which "0" or "1" continues is specified to a value that is integer times as long as T within a range of 3 T to 11 T. This is because it is intended to prevent such a situation that the reproduction of the clocks upon reproduction becomes difficult because "0" or "1" continues for a long period of time. The invention is not limited to the EFM modulation but intends to accomplish a similar object even in another digital modulation such as an 8–16 modulation for converting 8 bits into a pattern of 16 channel bits. In other words, in the digital modulation, data is converted so as to increase the minimum inverting interval of the recording/reproduction data as much as possible and to reduce the maximum inverting interval as much as possible. Therefore, when the second data is recorded as a displacement of the pit, an amount of data which can be recorded averagely is specified in accordance with the digital modulation system. For example, in case of the EFM modulation, about three bits are inserted as an average per two bytes (34 T including the connection bits) of the data. In case of directly recording the second data by a binary value, therefore, three bits can be recorded per two bytes of the data. If a ternary recording, which will be explained hereinlater, is performed, 4.5 bits can be recorded.

Since the maximum inverting interval (maximum pit length) is set to 11 T as mentioned above, such a situation that the reading position of the reproducing beam spot is deviated from the track center can be prevented to a certain extent. However, in dependence on the bit pattern of the second data, there is such a fear that the displacement for the track center is biased to one direction, so that a problem in which the tracking upon reproduction has an offset occurs. To avoid such a problem, the pits locating on the track center are consciously arranged in one frame.

In the example of FIG. 6, as shown by hatched portions, the pits which are arranged in the head area (frame sync pattern and subcode) of one frame and an almost intermediate area (data Q4 and D13) of one frame are formed on the track center. Such a situation that the tracking upon reproduction has the offset can be prevented by those pits on the track center. The pits on the track center can be also arranged in one of the head area and the intermediate area of one frame. In place of a plurality of pits, one pit can be also arranged on the track center.

To prevent the tracking from having the offset, it is effective to modulate the second data and record it instead of directly recording the second data. As a modulation system, various systems such as 8–9 conversion for converting 8 bits into 9 bits, 8–10 conversion for converting 8 bits into 10 bits, and the like can be used. By performing the modulation, the necessity of arranging the pits onto the track center as mentioned above can be also eliminated.

Figures 7A, 7B:
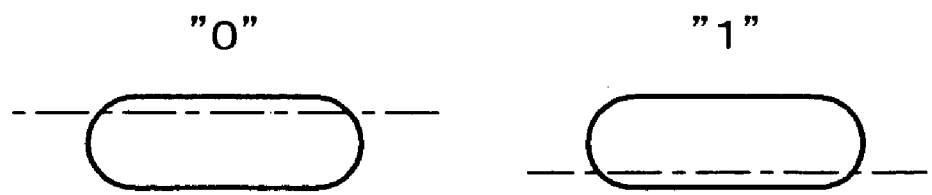
FIGS. 7A and 7B are schematic diagrams for explaining an example of a modulating process of second data which can be used in the invention.

FIGS. 7A and 7B show an example of a 4–5 conversion. As shown in FIG. 7A, "0" or "1" is allocated in accordance with the direction of the displacement of the pit. In accordance with a table of a conversion rule shown in FIG. 7B, 4 bits of a data word (data symbols) are converted into 5 bits of a code word (code symbols). "0" (or "1") of 2 bits and "1" (or "0") of 3 bits are included in each code word. Such a situation that four or more "0" or "1" continue is prevented every code word.

Further, according to the 4–5 conversion shown in FIG. 7B, in an edge portion of the code word, the number of "0" or "1" is set to 2 or less and the number of "0" or "1" which continues at a connecting point of two code words is set to 4 or less. By modulating the displacement of the pit by the 4–5 converted second data, such a situation that the tracking has the offset can be prevented. Moreover, according to the 4–5 conversion shown in FIG. 7B, a bit pattern which becomes an odd parity if the exclusive OR of 5 bits of the code word is arithmetically operated is formed, thereby allowing the system to have an error detecting ability.

The multivalue recording using a displacement 0 (namely, the pit on the track center) in addition to the displacement to the right and left for the recording (reproducing) direction as a displacement of the pit will now be described with reference to FIG. 8. Three bits of the second data are allocated for the displacement of two pits (the pit lengths are not always equal) which continue in the recording direction. Assuming that the recording direction is set to the direction from the left to the right which faces the drawing, for example, three bits "010" are allocated for two pits comprising the pit having the right displacement for the track center and the pit having the left displacement.

Figure 8:
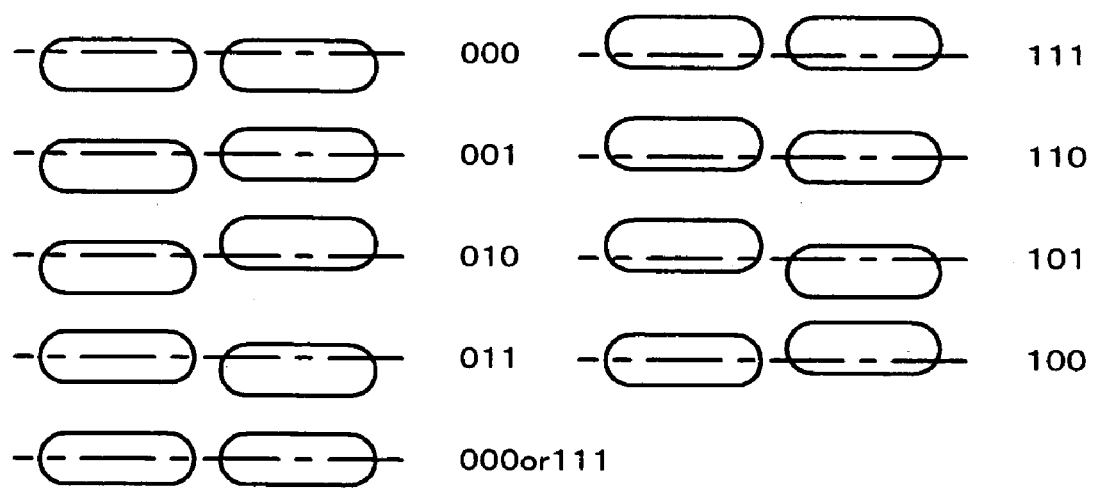
FIG. 8 is a schematic diagram for explaining a multivalue recording process which can be used in the invention.

Two pits locating on the track center as shown on the bottom side in FIG. 8 are used as special pits which are not ordinarily used. That is, three bits "000" or "111" are allocated to those two pits and properly used in place of two pits (both of them have the right displacement) which are usually allocated to "000" or two pits (both of them have the left displacement) which are usually allocated to "111". When "000" or "111" of the second data continue, since the offset of the tracking occurs, special two pits are used in such a case. Whether the special two pits correspond to "000" or "111" is specified by three bits expressed by two pits before and after them. By performing the multivalue recording as shown in FIG. 8, the data amount of the second data which can be recorded can be set to be larger than that of the first data of a predetermined amount.

The kind or the like of the second data which is recorded as a displacement of the pit will now be described. In the above example, the second data corresponds to the data of lower 4 bits and the number of bits per sample of the audio data is expanded to 20 bits, thereby improving the sound quality. As another example of the second data for improvement of the sound quality, there is audio data for realization of multichannels. While the data of the existing compact disc is generally the data of two channels, data of a plurality of channels is further recorded as second data. For example, data of a low frequency component of the center channel can be recorded and data of the right and left rear channels can be recorded. In this case, since an amount of data which can be recorded as second data is small, audio data which has preliminarily been subjected to a compressing process (MP3 (MPEG1 Audio Layer 3), ATRAC (Adaptive Transfer Acoustic Coding), etc.) can be also recorded. In dependence on the compressing process, the same audio data as the first data can be recorded as second data and the second data reproduced independently from a reproducing apparatus can be also recorded into another data recording medium, for example, a memory card.

Character data associated with the first data can be recorded as second data. For example, titles of music pieces, a recording of the activity of a singer, words, and the like can be recorded. A record company and a URL (Uniform Resource Locator) such as a home page or the like of the artist can be also recorded. Still image data, for example, a jacket photograph, a photograph of the artist, or the like can be also recorded as second data. Also in case of the image data, it is desirable to reduce the data amount by the compressing process. Karaoke data (namely, accompaniment of the music pieces recorded as first data) can be also recorded as second data.

Further, data for converting and/or controlling the first data can be also recorded as second data. For example, copyright data to protect the copyright of the first data can be also recorded. That is, in the case where the data has been enciphered to protect the copyright of the audio data as first data, key data to decode the encipherment is recorded as second data. Copy control information called SCMS (Serial Copy Management System) can be also recorded as second data. SCMS is information regarding the inhibition/permission of the copying operation, the generation of the copy, and the like.

Further, a digital watermark has been proposed as a technique for preventing the illegal copy of a digital copyrighted works (image, music, etc.). This technique is a method of embedding ID information (an ID number of the copyright holder, an ID number of a record company, an ID number of the user of music software, etc.), the copy control information, the key to decode the encipherment, and the like as watermark information into the digital copyrighted works. The embedded ID information, copy control information, key, and the like are not lost even if a process such as a data compression or the like is performed. Therefore, processes such that whether the copy is the illegal copy or not is discriminated, the copying operation is controlled, the encipherment is decoded, and the like can be performed by using those information embedded as watermark information.

The second data in the invention mentioned above can be used as key data for detecting or controlling the embedded ID information or the like. That is, the key data shows the location where the ID information or the like has been embedded, the embedding method, or the like. The key data itself can be also enciphered and protected. A part of the watermark information can be also formed by the second data.

The above embodiment relates to the case where the invention is applied to the optical disc and the music data recorded thereon. However, the invention can be also applied to an optical disc other than the compact disc. For example, the invention can be also applied to a CD-ROM, DVD (Digital Versatile Disc or Digital Video Disc). In case of the DVD, the 8–16 modulation is used in place of the EFM modulation. The invention is not limited to the optical disc but can be also applied to an optical card. Further, the invention is not limited to the music data but can be also applied to protect the copyright of software game, navigation software, computer software, or the like recorded on the CD-ROM or the like.

According to the invention, the first data can be recorded by the pits and land and the second data can be also recorded as a displacement of the pit. Therefore, the quality of the music data recorded as first data can be improved by using the second data. The second data can be also used to protect the copyright of the first data. Such a situation that the data amount of the first data which can be recorded on one medium is reduced by recording the second data does not occur. Further, since the displacement of the pit is set to a value within a predetermined amount in a range where the off-track does not occur, the existing player can reproduce the first data and can have a reproduction compatibility.

The invention claimed is:

1. A recording apparatus for recording to a mother disc, comprising:
   a bit operating unit for splitting a digital signal into a first data comprised of upper bits and a second data comprised of lower bits;
   a light source for outputting a recording beam;
   a light modulator for modulating said recording beam outputted from said light source based on said first data;
   a light deflector for deflecting based on said second data the modulated recording beam outputted from said light modulator and producing a variable offset from a track center in a radial direction of said other disc; and
   an objective lens for converging said modulated recording beam that is outputted from said light deflector with said variable offset from said track center in said radial direction onto said mother disc.

2. The apparatus according to claim 1, further comprising:
   a first driving unit to which said first data is supplied from said bit operating unit and that drives said light modulator; and
   a second driving unit to which said second data is supplied from said bit operating unit and that drives said light deflector.

3. The apparatus according to claim 2, wherein said bit operating unit forms said first data based on main data that is recorded on said mother disc and forms said second data based on additional data of the main data that is recorded on said mother disc.

4. A recording method for recording to a mother disc, comprising the steps of:
   splitting a digital signal into a first data comprised of upper bits and a second data comprised of lower bits;
   modulating a recording beam outputted from a light source based on said first data and producing a modulated recording beam;
   deflecting based on said second data said modulated recording beam and producing a variable offset from a track center in a radial direction of said mother disc; and
   converging said modulated and deflected recording beam with said variable offset from said track center in said radial direction onto said mother disc by an objective lens.

5. The method according to claim 4, wherein said second data additionally comprises additional data.

* * * * *

UNITED STATES PATENT AND TRADEMARK OFFICE
CERTIFICATE OF CORRECTION

PATENT NO. : 7,099,258 B2
APPLICATION NO. : 10/697580
DATED : August 29, 2006
INVENTOR(S) : Yoichiro Sako and Masanobu Yamamoto It is certified that error appears in the above-identified patent and that said Letters Patent is hereby corrected as shown below:

Column 2, Line 10, delete "of claim 10";
Column 2, Line 26, delete "of claim 15";
Column 2, Line 41, delete "of claim 22";
Column 2, Line 59, delete "of claim 32";
Column 3, Line 3, delete "of claim 44";
Column 3, Line 16, delete "of claim 47";
Column 3, Line 30, delete "of claim 53";
Column 12, Line 67, "works" should read --work--;
Column 14, Line 25, "2" should read --1--.

Signed and Sealed this

Seventeenth Day of April, 2007

JON W. DUDAS
*Director of the United States Patent and Trademark Office*